(12) United States Patent
Heideman

(10) Patent No.: US 7,250,317 B2
(45) Date of Patent: Jul. 31, 2007

(54) METHOD OF FABRICATING OPTICAL WAVEGUIDE REFLECTORS

(75) Inventor: René Gerrit Heideman, Oldenzaal (NL)

(73) Assignee: LioniX BV (NL)

( * ) Notice: Subject to any disclaimer, the term of this patent is extended or adjusted under 35 U.S.C. 154(b) by 190 days.

(21) Appl. No.: 10/499,579

(22) PCT Filed: Dec. 20, 2002

(86) PCT No.: PCT/NL02/00860

§ 371 (c)(1),
(2), (4) Date: Nov. 12, 2004

(87) PCT Pub. No.: WO03/056374

PCT Pub. Date: Jul. 10, 2003

(65) Prior Publication Data

US 2005/0069253 A1    Mar. 31, 2005

(30) Foreign Application Priority Data

Dec. 21, 2001 (NL) ..................................... 1019637

(51) Int. Cl.
*H01L 21/00* (2006.01)

(52) U.S. Cl. ................. 438/31; 438/707; 257/E21.483; 359/247; 385/130

(58) Field of Classification Search .................. 438/31, 438/707; 385/15, 18, 130; 359/34, 247
See application file for complete search history.

(56) References Cited

U.S. PATENT DOCUMENTS

| | | | |
|---|---|---|---|
| 4,735,677 A | 4/1988 | Kawachi et al. | |
| 5,369,529 A * | 11/1994 | Kuo et al. | 359/858 |
| 5,416,861 A | 5/1995 | Koh et al. | |
| 5,771,322 A * | 6/1998 | Matsumoto et al. | 385/31 |
| 6,108,472 A | 8/2000 | Rickman et al. | |
| 6,271,049 B1 * | 8/2001 | Auracher et al. | 438/29 |
| 6,507,044 B1 * | 1/2003 | Santana et al. | 257/48 |
| 6,722,792 B2 * | 4/2004 | Raj et al. | 385/88 |
| 2002/0037137 A1 * | 3/2002 | Wu et al. | 385/49 |
| 2003/0118288 A1 * | 6/2003 | Korenaga et al. | 385/49 |
| 2003/0142896 A1 * | 7/2003 | Kikuchi et al. | 385/14 |
| 2004/0165828 A1 * | 8/2004 | Capewell et al. | 385/47 |
| 2006/0022289 A1 * | 2/2006 | Badhei et al. | 257/432 |

FOREIGN PATENT DOCUMENTS

| | | |
|---|---|---|
| EP | 0 816 878 A2 | 1/1988 |
| EP | 0 652 454 A | 5/1995 |
| WO | WO 90/02349 A | 3/1990 |

* cited by examiner

*Primary Examiner*—W David Coleman
(74) *Attorney, Agent, or Firm*—DeMont & Breyer, LLC

(57) ABSTRACT

The invention relates to a device for introducing light into a waveguide, which device comprises: a light source, preferably an electro-optical converter, more preferably a VCSEL, for generating a light beam; a reflector for receiving at least a part of the light beam and for reflecting at least a part of the received part, wherein the waveguide and the material layer lie substantially mutually in line and both rest at least partially on a substantially flat substrate, wherein the light source and the reflector are positioned relative to the waveguide such that at least a part of the reflected part is introduced into the waveguide.

The invention also relates to a device for emitting light from a waveguide. The invention further relates to a method for manufacturing such devices.

8 Claims, 2 Drawing Sheets

METHOD OF FABRICATING OPTICAL WAVEGUIDE REFLECTORS

STATEMENT OF RELATED APPLICATIONS

This application claims priority of:
1. Netherlands patent application number NL 1019637, filed on 21 Dec. 2001, and
2. PCT patent application number PCT/NL02/00860, filed on 20 Dec. 2002.

The invention relates to a device for introducing light into a waveguide, which device comprises: a light source, preferably an electro-optical converter, more preferably a VCSEL, for generating a light beam; a reflector for receiving at least a part of the light beam and for reflecting at least a part of the received part, which reflector comprises an at least partially concave reflecting surface and at least a part of an end surface of a material layer, and a waveguide provided with a light-conducting layer wherein the waveguide and the material layer lie substantially mutually in line and both rest at least partially on a substantially flat substrate, wherein the light source and the reflector are positioned relative to the waveguide such that at least a part of the reflected part is introduced into the waveguide. The invention also relates to a device for emitting light from a waveguide, which device comprises: a light receiver, preferably an opto-electrical converter, more preferably a photodiode; a waveguide provided with a light-conducting layer, wherein the waveguide and the reflector are positioned relative to the light receiver such that at least a part of the reflected part is received by the light receiver, and a reflector for receiving at least a part of a light beam emitted from the waveguide and for reflecting at least a part of the received part, which reflector comprises an at least partially concave reflecting surface and at least a part of an end surface of a material layer, wherein the waveguide and the material layer lie substantially mutually in line and both rest at least partially on a substantially flat substrate. The invention further relates to a method for manufacturing such devices.

American patent specification U.S. Pat. No. 6,108,472 describes a device for emitting light from a waveguide resting on a substrate. Both the waveguide and a reflective surface are herein formed from one and the same silicon layer which rests on an insulator layer arranged on a substrate in a SOI (silicon-on-insulator) configuration. Via the reflective layer the light can be redirected to a light receiver. The advantage of the known device is that the mutual positioning of the waveguide and the reflective surface can be defined by means of a single lithographic processing step. As well as advantages, the known device also has drawbacks. An important drawback of the known device is that the generally (slightly) diverging light incident upon the reflective surface forming part of the (monocrystalline) silicon part is diverged considerably (further) during reflection of the light in the direction of the reflecting surface. It will thus be possible to detect only a relatively small part of the reflected light with the light receiver.

U.S. Pat. No. 5,416,861 (D1) discloses an optical synchronous clock distribution device, wherein light beams emitted by a waveguide contained in a dielectric layer can be reflected via a concave micro-mirror towards a light detector. The concave micro-mirror converges the commonly diverging light beam resulting in an improved detection of emitted light. Besides this advantage, the known device has several drawbacks. The device known from D1 makes part of the field of micro(structural)-technology, thereby comprising several micro-dimensioned components, such as said micro-mirror. The objective problem underlying D1 is that it will be very difficult and hard to accurately place the micro-mirror into the optimal position between two neighbouring dielectric (micro-)layers for reflecting the emitted light beams as a whole.

The present invention has for its object to provide an improved device for introducing respectively emitting light into respectively from a waveguide, whereby light can be redirected in relatively efficient manner.

The invention provides for this purpose a device for introducing light into a waveguide of the type stated in the preamble, characterized in that the waveguide and the material layer are formed at least partially by the same layer structure. Both the reflector and the waveguide can therefore be manufactured from one and the same material layer, which can both be deposited in one process run. This is advantageous since a post-positioning of the reflector onto the substrate is no longer needed. The layer is deposited onto the substrate in one process run, and subsequently the reflective will be etched in the material layer. This leads to a more simple a efficient device for introducing light into a waveguide. The main direction of the reflected part herein lies substantially perpendicular to the main direction of the received part. Due to the concave form of the reflector the light will be converged slightly during reflection of the light by the reflector, which generally results in a relatively intensive reflected light beam which can further be received by the waveguide. Because of the converging action of the reflected light beam, it will be possible for the waveguide to receive all of, or at least a relatively large part of the light beam. In relatively simple manner a device according to the invention is thus obtained with which a light beam can be redirected with a relatively high efficiency.

It is noted that within the scope of the present invention, the term 'light' comprises all electromagnetic phenomena and does not therefore preclude frequencies outside the visible spectrum.

EP 0816878 describes a method and device for introducing light into a waveguide, wherein a recess is arranged in a substrate, whereafter a metal layer, which serves as mirror, is arranged on a side face of this recess. The recess is then filled with a waveguide material, so that a waveguide is formed. As light source can be used a VCSEL (vertical cavity surface emitting laser) which is mounted on the whole of substrate and reflecting side surface and waveguide arranged therein such that the light emitted by the light source or VCSEL is introduced into the waveguide via the reflecting surface. Forming of the recess and arranging waveguide material therein is however difficult. The number of suitable materials is furthermore small and the possibilities of making more complex networks of waveguides are limited. Another relevant drawback of this already known device is that a flat mirror is also used, whereby an incident (slightly) diverging light beam will be diverged further during reflection via the mirror, whereby part of the light beam will already exit the waveguide just after reflection, which is generally undesirable.

The material layer can be built up from a plurality of (sub)layers. The waveguide can comprise a light-conducting channel, limited in width, or a light-conducting 'slab', in principle extending without limit in the width. Since they rest on the same substrate and lie at the same height, the reflector or reflecting face and the waveguide are in principle well aligned relative to each other, whereby the part of the reflected part introduced into the waveguide will in principle be large.

The light source preferably comprises a VCSEL. A VCSEL is small and compact, readily available, can be arranged relatively simply and is found to be very satisfactory in practice. A LED or a laser diode can for instance also serve as light source, as can a passive element such as a glass fibre or a reflector. The light-conducting layer can herein be built up at least partially from at least one of the materials: silicon oxynitride; silicon nitride, for instance in stoechiometric or silicon-rich configuration; silica, for instance Ge- or F-doped; a polymer, for instance polyimide, polyurethane or BCP; an epoxy, for instance SU8; indium phosphide, gallium arsenide; lithium niobate. Structures built up from such materials are common and much used as waveguides, although other waveguide materials are also suitable.

In preference the end surface of the material layer is at least partly provided with a first part of a metal layer. The metal layer gives the reflecting surface a larger reflection coefficient, so that the reflected part of the part received by the reflector will be larger, which will increase the total efficiency. A second part of the metal layer can herein form an electrode for the light source. The metal layer can then also serve as electrical connection, for instance of the VCSEL or the photodiode.

The invention also provides a device for emitting light from a waveguide of the type stated in the preamble, characterized in that the waveguide and the material layer are formed at least partially by the same layer structure. Both the reflector and the waveguide can therefore be manufactured from one and the same material layer, which can both be deposited in one process run. This is advantageous since a post-positioning of the reflector onto the substrate is no longer needed. The layer is deposited onto the substrate in one process run, and subsequently the reflective will be etched in the material layer. This leads to a more simple a efficient device for emitting light from a waveguide. The main direction of the reflected part herein lies substantially perpendicular to the main direction of the received part.

The light receiver preferably comprises a photodiode. A photodiode is small and compact, readily available, can be arranged relatively simply on the substrate and is found to be very satisfactory in practice. A PIN for instance, or a passive element such as a glass fibre or a reflector can however also serve as light receiver.

In both devices the reflected part is bundled and oriented to a greater or lesser extent by the curvature as stated above, whereby the part introduced into the waveguide, respectively the part received by the light receiver is increased, which will cause the total efficiency to increase. The reflecting surface can also comprise at least one facet.

'Facet' is here understood to mean a substantially flat part of a surface. The reflecting surface can for instance be an anisotropically etched etching surface at an angle to the main direction of the waveguide, or be built up for instance from a number of facets in an angular curved form. The reflecting surface can also take an angular form and thus be provided with one or more angles, whereby a concave and therefore converging action of the reflecting surface can also be achieved. The profile of the reflecting surface can be chosen subject to the type and the form of the light conductor and light source or light receiver.

The substrate herein preferably consists substantially of silicon. Silicon is much used as basic material for integrated and miniaturized devices. At least part of the required layers and structures can then be arranged in and/or on the substrate by means of thin-film techniques; etching techniques and photolithographic techniques known from the field of 'microsystem technology', also referred to as 'microstructural technology'.

The invention further provides methods for manufacturing devices of the types stated in the preamble, comprising the steps of: A) depositing arranging on a substrate a waveguide (2, 2') and a reflector (5, 5') formed by an end surface (11, 11') of a material layer (12, 12') onto a substrate, wherein the waveguide is provided with a light- conducting layer (17, 17'), B) applying a concave reflector (5, 5') by position-selective etching an end surface (11, 11') of said material layer (12, 12'), and , and C) positioning a light source respectively light receiver such that light displacement between the waveguide on the one hand and the light source respectively light receiver on the other is possible via the reflector. Advantageously, step A) can be carried out in one process run, wherein both the waveguide and the material layer can have the same layer structure.

The light-conducting layer can herein be built up at least partly from at least one of the materials: silicon oxynitride; silicon nitride, for instance in stoechiometric or silicon-rich configuration; silica, for instance Ge- or F-doped; a polymer, for instance polyimide, polyurethane or BCP; an epoxy, for instance SU8; indium phosphide, gallium arsenide; lithium niobate, although other waveguide materials are also suitable. This choice of materials is in principle unlimited. The material layer and the waveguide are herein preferably structured at least partly the same in terms of layer structure and materials. This entails a significant simplification of the production process since the number of layers and processing steps required can hereby be limited considerably.

The method herein preferably comprises the step: X.;XX., of forming at least a part of the end surface by means of position-selective etching of the material layer. Position-selective etching is a common and well-developed technology with which it is possible to realize with great precision a well-defined end surface or reflecting surface. The position-selective etching can herein substantially comprise isotropic etching. In isotropic etching, i.e. not varying in direction, the formed end surface or reflecting surface will be curved, whereby the reflected part is bundled and oriented to a greater or lesser extent which will increase the total efficiency. Position-selective etching can also comprise substantially anisotropic etching. It is thereby possible to realize an etching surface or reflecting surface with one or more facets.

The methods herein preferably also comprise the step: Y.;YY., of arranging a metal layer on at least apart of the end surface of the material layer. Arranging a metal film and patterning thereof is a usual and well-developed technology with which it is possible to realize a well-defined metal pattern relatively simply and with great precision.

The method can herein also comprise the step: Z.;ZZ., of arranging a light-conducting medium such as a gel, glue or polymer with a suitable refractive index in order to improve the optical coupling between the light source or the light receiver and the waveguide. The total efficiency of the optical coupling can thus be increased.

The invention is elucidated hereinbelow with reference to three devices according to the prior art and two non-limitative embodiments of devices according to the invention.

For this purpose:

Figure 1:
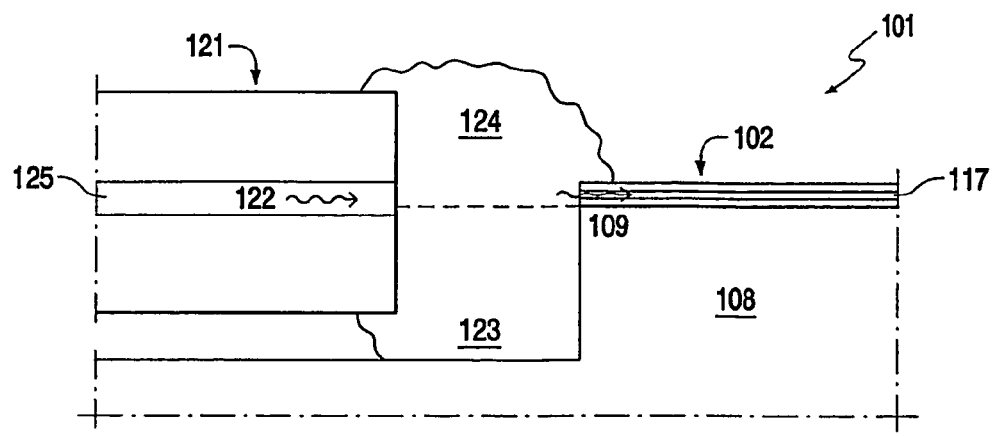
FIG. 1 shows a schematic cross-section of a first known device for optical coupling of a glass fibre to a waveguide.

FIG. 1 shows a first known device 101 for optical coupling of a waveguide 102 to a glass fibre 121. At least a part 109 of a light beam 122 fed by glass fibre 121 is introduced into waveguide 102. Glass fibre 121 rests in a V-shaped groove 123 which is etched out in a substrate 108, usually a silicon wafer. For a better optical coupling a gel or glue 124 is usually applied between glass fibre 121 and waveguide 102. Since the glass fibre 121 is generally much thicker than waveguide 102, glass fibre 121 lies partly recessed into V-shaped groove 123. This is necessary for a good mutual alignment of light-conducting glass fibre core 125 and a light-conducting layer 117 forming part of waveguide 102. This first known device 101 is relatively complex and the number of steps for manufacture thereof is relatively large, the etching out of the V-shaped groove 123 being particularly difficult and time-consuming.

Figure 2:
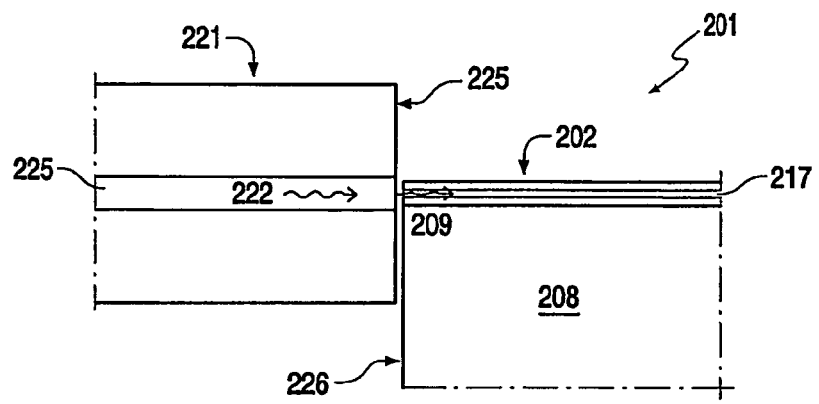
FIG. 2 shows a schematic cross-section of a second known device for optical coupling of a glass fibre to a waveguide.

FIG. 2 shows a second known device 201 for optical coupling of a waveguide 202 to a glass fibre 221. At least a part 209 of a light beam 222 fed by glass fibre 221 is introduced into waveguide 202. Waveguide 202 with substrate 208 is sawn through and glass fibre 221 is fixed with an outer end 225 against the sawn surface 226. This second known device 201 is also relatively complex and the number of steps for the manufacture thereof is relatively large, the arranging and positioning of outer end 225 of glass fibre 221 against the saw cut 226 being particularly difficult and time-consuming.

Figure 3:
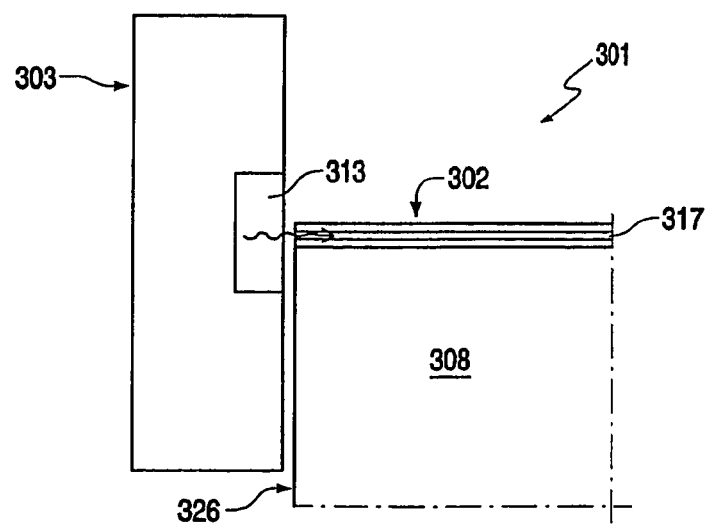
FIG. 3 shows a schematic cross-section of a third known device for optical coupling of an active light source to a waveguide.

FIG. 3 shows a third known device 301 for optical coupling of a waveguide 302 to an active light source 303, for instance a VCSEL 313. Waveguide 302 with substrate 308 is again sawn through and optical element 303 is fixed against the sawn surface 326. This third known device 301 is also relatively complex and the number of steps for manufacture thereof is relatively large, the arranging and positioning of active light source 103 against saw cut 326 being particularly difficult and time-consuming.

Figure 4:
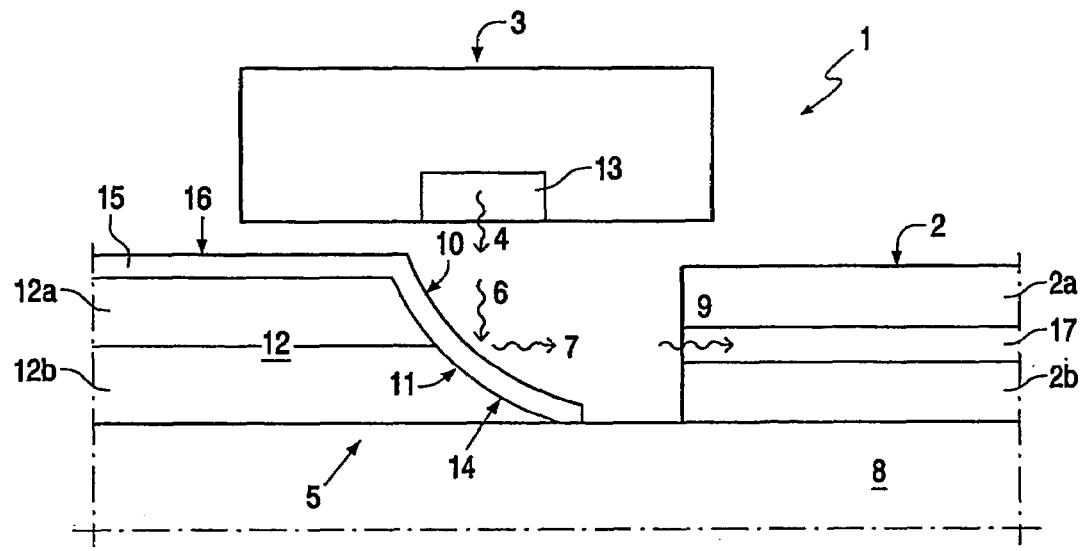
FIG. 4 shows a schematic cross-section of a first preferred embodiment of a device for introducing light into a waveguide according to the invention.

FIG. 4 shows a first preferred embodiment 1 of a device for introducing light into a waveguide according to the invention, wherein a light beam 4 is generated by a VCSEL 13. A part 6 of the light beam 4 is received by a reflecting surface 10. A part 7 of the received part 6 is reflected, a part 9 of this reflected part 7 being introduced into waveguide 2 or a light-conducting layer 17 forming part of waveguide 2. Waveguide 2 is built up from a number of layers 17,2a,2b arranged on a substrate 8, in this case a silicon wafer. Light source 3 is arranged in flip-chip mounting on substrate 8 with layer structure 12,12a,12b; 14,15,16; 2,2a,2b,17. The reflecting surface 10 is manufactured by means of position-selective isotropic etching of a material layer 12 arranged on substrate 8. A curved end surface 11 is thus created on which is arranged a first part 14 of a metal layer 15. Material layer 12 is build up from two (sub)layers 12a, 12b which can be deposited in one process run with the layers 17,2a,2b from which waveguide 2 is constructed.

Advantages of this first preferred embodiment 1 are: the material layer (12) can be arranged at least partly simultaneously with the waveguide (2), which means a significant simplification of the production process since the required number of layers and processing steps can hereby be limited considerably; the entire layer structure 12,12a,12b; 14,15, 16; 2,2a,2b,17 can be applied by means of thin-film techniques, etching techniques and photolithographic techniques known from the field of 'microsystem technology', also referred to as 'microstructural technology'; the reflector 5 or reflecting surface 10 and the waveguide 2 rest on the same substrate 8 and therefore lie in principle at the same height, whereby they are in principle properly aligned relative to each other, and the part 9 introduced into waveguide 2 will in principle be large;

the device 1 is compact; the VCSEL 13 is small and compact, readily obtainable, can be arranged relatively simply and is found to be very satisfactory in practice; due to the curve of the reflecting surface 10, the reflected part 7 is bundled and oriented to a greater or lesser extent, whereby the part 9 introduced into waveguide 2 will be increased; the metal layer 15 gives the reflecting surface 10 a large reflection coefficient, so that the reflected part 7 of the incident part 6 will be large; a second part 16 of metal layer 15 can also serve as electrical connection for the VCSEL 13; by coupling the light source 3 or VCSEL 13 more or less directly to waveguide 2, an intermediary glass fibre 121, 221 is no longer required.

Figure 5:
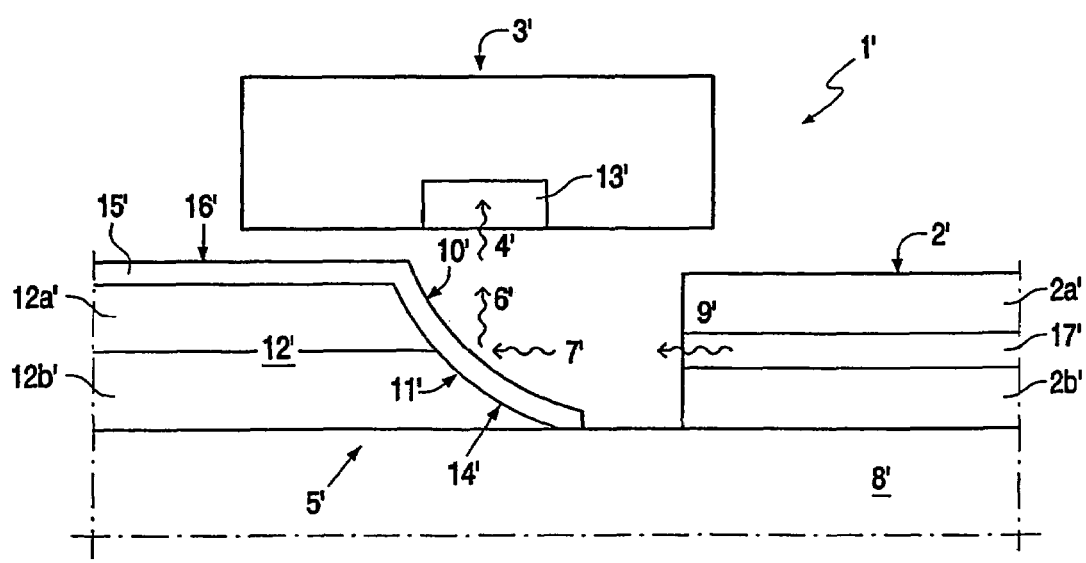
FIG. 5 shows a schematic cross-section of a second preferred embodiment of a device for emitting light from a waveguide according to the invention.

FIG. 5 shows a second preferred embodiment 1' of a device for emitting light from a waveguide according to the invention, wherein a light beam 9' emitted from a waveguide 2' is received and reflected by a reflector 5', whereafter a part 4' of the reflected part 6' is received by a light receiver 3', for instance a photodiode 13'. The advantages of this second embodiment 1' are mutatis mutandis the same as the stated advantages of the first preferred embodiment 1.

It will be apparent for a person skilled in the relevant field that the invention is not limited to the described and shown embodiments, and that a number of further variations is possible within the scope of the invention.

The invention claimed is:

1. A method comprising:
   (a) depositing a waveguide and a material layer onto a substrate, wherein said waveguide is provided with a light-conducting layer;
   (b) applying a concave reflector by position-selective etching an end surface of said material layer; and
   (c) positioning one of a light source and a light receiver such that light displacement is possible via said reflector between (i) said waveguide and (ii) said one of said light source and said light receiver.

2. The method of claim 1, wherein said light-conducting layer is built up at least partially from at least one of the materials silicon oxynitride, silicon nitride, silica, a polymer, an epoxy, indium phosphide, gallium arsenide, and lithium niobate.

3. The method of claim 1, wherein in terms of layer structure and materials said material layer and said waveguide have at least partially the same structure.

4. The method of claim 1, further comprising (d) forming at least a part of said end surface by means of position-selective etching of said material layer.

5. The method of claim 1, further comprising (d) arranging a metal layer on at least a part of said end surface of said material layer.

6. The method of claim 1, further comprising (d) arranging a light-conducting medium with a suitable refractive index in order to improve the optical coupling between (i) said one of said light source and said light receiver, and (ii) said waveguide.

7. The method of claim 4, wherein said position-selective etching comprises isotropic etching.

8. The method of claim 4, wherein said position-selective etching comprises anisotropic etching.

* * * * *